United States Patent [19]

Clegg et al.

[11] Patent Number: 4,618,545
[45] Date of Patent: Oct. 21, 1986

[54] RECOMBINATION ELECTRIC STORAGE CELLS

[75] Inventors: Gordon A. Clegg, Rossendale; Phillip Jarrett, Bramhall, both of England

[73] Assignee: Chloride Group Public Limited Company, London, England

[21] Appl. No.: 747,438

[22] Filed: Jun. 21, 1985

[30] Foreign Application Priority Data

Jun. 22, 1984 [GB] United Kingdom ............... 8415949

[51] Int. Cl.⁴ .......................................... H01M 2/18
[52] U.S. Cl. ................................. 429/130; 429/138; 429/142; 429/143
[58] Field of Search ............... 429/130, 138, 141–145

[56] References Cited

U.S. PATENT DOCUMENTS 2,360,658 10/1944 Doughty ........................... 429/114
2,633,479 3/1953 Bidard et al. ..................... 429/138
4,068,047 1/1978 Dangel et al. .................... 429/142
4,169,003 9/1979 Dangel et al. .................... 156/179
4,383,011 5/1983 McClelland et al. ........... 429/149 X

FOREIGN PATENT DOCUMENTS 21472 of 1906 United Kingdom ............... 429/142
1513666 6/1978 United Kingdom .
1569745 6/1980 United Kingdom .
2062945 5/1981 United Kingdom .

Primary Examiner—Brian E. Hearn
Assistant Examiner—Stephen J. Kalafut
Attorney, Agent, or Firm—Finnegan, Henderson, Farabow, Garrett & Dunner

[57] ABSTRACT

A sealed lead acid recombination electric storage cell comprises a container containing alternating positive and negative plates separated by separators. Each separator includes reinforcing means extending over substantially its entire area and constructed to define a plurality of apertures and being surrounded by microfine glass fibre material. The plates and separators are under a compressive force and the reinforcing members are so constructed and arranged that the major proportion of the compressive force is transmitted through the reinforcing members while the major proportion of the area of the plates is contacted by the glass fibre material.

11 Claims, 7 Drawing Figures

RECOMBINATION ELECTRIC STORAGE CELLS

The present invention relates to recombination electric storage cells, particularly such cells of lead acid type and more particularly such cells of traction or motive power type. The invention is particularly concerned with separators for separating the plates of flat plate lead acid motive power cells, that is to say cells in which both the positive and negative plates comprise grids bearing active material as compared to so called tubular cells in which the active material of the positive plates is retained in position by a plurality of interconnected porous tubes.

Recombination cells are those which, in general, contain a reduced amount of electrolyte such that substantially all the electrolyte is absorbed in the plates and separators and in which gas evolved within them is not normally vented to atmosphere but is induced to recombine within the battery.

Motive power cells are those which are adapted to provide a current for an extended length of time, e.g. 5 to 8 hours, for the purpose of providing motive power in a vehicle and are then regularly recharged, generally on a daily basis. Such cells are thus regularly "deep cycled", that is to say cycled between a fully charged state and a nearly fully discharged state, and this deep cycling is associated with a cyclical change in volume of the positive active material. This change in volume coupled with the heat produced by virtue of the substantial discharge currents which are generally required results in a tendency of the positive active material to crack away from and thus lose electrical contact with the metallic current conductors of the positive plates. This in turn results in a gradual failure of the cell by reason of a progressive loss of positive capacity and by reason of short-circuits being formed by positive active material which becomes dislodged from the positive plates and forms bridges between adjacent plates.

One way in which this tendency to progressive failure is counteracted in conventional cells which are flooded with electrolyte is by making the positive plates of tubular type, as referred to above. In this event, the porous tubes which are commonly made of non-woven polyester material expand and contract with the positive active material contained within them and thus positively retain it in contact with the conductive spine conventionally provided within each tube. However, with conventional flat plate motive power cells progressive failure is counteracted by placing the plates and separators under a substantial compressive force which tends to resist the expansion of the positive active material and positively to retain it in contact with the grids of the positive plates.

Recombination cells incorporate compressible fibrous absorbent separator material, in practice a microfine glass fibre separator material, which is maintained by a light compressive load in contact with the adjacent plates so as to ensure that the separators will provide adequate electrolyte for the plates' electrochemical requirements. Microfine glass fibre separator material is extremely compressive but fortunately the compressive load to which it need be subjected is very light.

Recombination cells and batteries have hitherto only been used and proposed for those applicactions in which the loss of positive active material for the reason referred to above does not constitute a major problem, principally for automotive applications. as exemplified by British Pat. No. 2062945 of the present applicants. It has, however, been believed not to be possible to manufacture a flat plate motive power cell of recombination type because under the compressive load to which the plates and separators must be subjected if the cell is not to be prone to premature failure by reason of positive active material loss the microfine glass fibre separator material would be compressed to such a small thickness that it could not hold sufficient electrolyte for the plates' electrochemical requirements. The electrolyte requirement per unit area of the plates is in any event greater in a motive power cell than an automotive battery by reason of the fact that the plates are conventionally substantially thicker and it is found that due to the extreme compressibility of microfine glass fibre separator material the problem can not be solved by simply using separator material of greater uncompressed thickness because at the thickness that would be required to hold the required volume of electrolyte there would be so many glass fibres between adjacent plates that the electrical resistance between them would be unacceptably high and oxygen would be unable to diffuse through the separators sufficiently well for a satisfactory recombination function to occur.

Accordingly, it is an object of the present invention to provide a recombination electric storage cell, in particular of flat plate motive power type, in which the separators can be subjected to a substantial compressive force but yet still not be compressed to a negligible thickness and will permit a satisfactory recombination operation of the cell.

According to the present invention there is provided a recombination electric storage cell in which the alternating positive and negative plates are separated by separators and are under a mutual compressive force, each separator comprising reinforcing means and microfine glass fibre material surrounding the reinforcing means which comprise one or more reinforcing members and extend over substantially the entire area of the separator, the reinforcing means being constructed to define a plurality of apertures and being so constructed and arranged that the major proportion of the compressive force is transmitted through the reinforcing members whilst the major proportion of the area of the plates is contacted by the glass fibre material. Thus in the cell according to the present invention microfine glass fibre material, which is preferably of the type disclosed in the prior specification referred to above, surrounds one or more reinforcing members which are preferably substantially incompressible. Thus when the separators are subjected to a compressive force between the plates of the recombination cell their thickness initially decreases but then remains substantially constant when the reinforcing member or members engage the opposed surfaces of adjacent plates. If there is a plurality of reinforcing members they are spaced apart or disposed to define gaps between them and if there is a single reinforcing member it has a plurality of apertures formed in it to permit the passage of ions thus ensuring that when damp with electrolyte the separator has an adequate conductivity. The reinforcing member or members thus transmit the major proportion and preferably substantially all the compressive force from plate to plate and in between these members or in the apertures in the single reinforcing member the glass fibre material, which in use is damp with electrolyte, contacts the active material surfaces of the plates and supplies them with electrolyte for their electrochemical requirements. The reinforcing member or members thus prevent the glass fibre material from being compressed to a thickness at which it could only hold an insufficient amount of electrolyte and thereby permit the glass fibre material to fulfil its normal required function notwithstanding the fact that the separators are subjected to a substantial compressive force. The compressive force is of course applied to the surfaces of the plates substantially only over the area of the reinforcing member or members or a lesser area depending on the precise shape of the reinforcing member or members and not over those areas between the reinforcing members or the areas over the apertures which are filled merely with compressible absorbent material. It is however found that applying the compressive force over only a percentage, e.g. between 3 and 10% of the area of the positive plates is sufficient to retain the positive active material in position thereby avoiding the disadvantages discussed above. At those areas where the reinforcing member or members contact the surfaces of the plates, albeit the inter-position of a thin compressed layer of the glass fibre material, the supply of electrolyte to the active material will be somewhat impaired but it is found that this does not constitute a problem since electrolyte can seep to these areas from those areas which are properly supplied with electrolyte by the compressible absorbent material and that the performance of the cell is not impaired. In one embodiment each separator includes a plurality of reinforcing members and these may be spaced substantially parallel members. These members need not necessarily be connected but may be placed within the separator during its manufacture by a continuous process similar to that used in paper making in which two continuous webs of glass fibre material are overlaid with continuous reinforcing members placed between them and the resultant laminated structure then cut into individual separators.

It is however preferred that each separator has only a single reinforcing member. This may comprise a first set of spaced parallel reinforcing elements integrally connected by a second set of spaced parallel connection elements extending transverse thereto to form a reticular structure. The cross-sectional area of the connection elements may be less than or equal to that of the reinforcing elements. Ensuring that certain of the elements of the reinforcing members have a reduced cross-section facilitates the wetting of the separators with electrolyte if this should be done once the recombination cell has been assembled but this is not essential since the wetting of the separators can occur prior to the assembly of the cell in which event the first set of reinforcing elements may be connected by a second set of spaced parallel connecting elements whose cross-section is substantially the same as that of the first set of reinforcing elements and thus themselves constitute reinforcing elements. In this event the reinforcing member is preferably a grid of e.g. plastics material, such as that sold under the Trade Mark NETLON. If such a grid is used the apertures are preferably of diamond shape with the major axis of the diamonds being between 4 and 15 mm long and the minor axis between 2 and 8 mm long. The reinforcing elements may be between 0.5 and 1.5 mm thick and 0.5 and 3 mm wide. If the inclined elements pass over one another the thickness of the grid will of course be increased at the nodes of the diamonds.

If only a single reinforcing member is used, this is formed with a plurality of apertures. It is also preferably so shaped, for instance in the manner of a corrugated sheet, that the compressive force is transmitted through only a minor proportion of its area.

In one embodiment of the invention each separator further includes an outer porous fabric sheath. This sheath is conveniently made of material similar to that from which the tubes of tubular plates are made and may thus constitute a woven or non-woven polyester fabric. The separator is preferably sealed inside this sheath and for this purpose one or more of the edges of the sheath may be sealed by ultrasonic welding or stitching. The provision of such a sheath enables the separators to be handled without difficulty as units since it will be appreciated that microfine glass fibre material is both soft and fragile and thus easily damaged and in addition the sheath serves a certain load-spreading function and thus results in the load exerted by the reinforcing member or members on the plates to be spread over a greater area whilst simultaneously facilitating the seeping in of electrolyte in between the reinforcing members and the adjacent plates by virtue of its capillarity.

The plates of the cell are preferably flat plates as described above and incorporate a metallic grid, which in the case of a lead acid battery is of lead or lead alloy, which may be of expanded type but is more preferably of cast type including two sets of parallel mutually perpendicular interconnected mesh elements carrying active material in the conventional manner. This opens up the possibility of the reinforcing member or members being positioned with respect to the plates such that the compressive force is exerted on the plates in positions corresponding to some or all of the mesh elements and thus in the preferred embodiment the plates include a plurality of substantially parallel current carrying metallic members which carry active electrode material, at least some of the reinforcing members or reinforcing elements of the separators being in registry with current carrying members of the associated plates. This permits the compressive force transmitted through a separator to be transmitted as directly as possible to a metallic current carrying element and then through to the next separator rather than through a largely unsupported area of active electrode material.

Further features and details of the present invention will be apparent from the following description of certain specific embodiments which is given by way of example only with reference to the accompanying diagrammatic drawings, in which.

Figure 7:
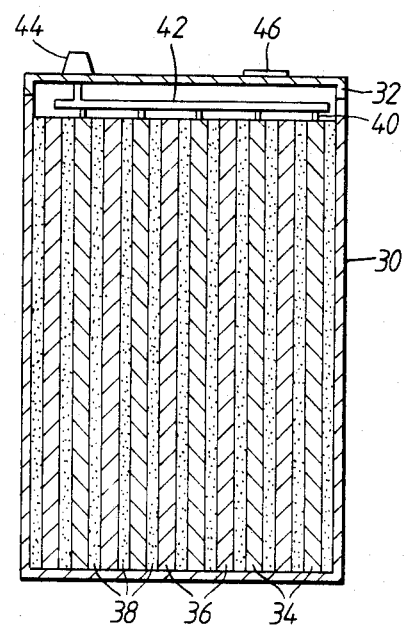
FIG. 7 is a diagrammatic side sectional elevation of a lead acid recombination cell in accordance with the invention.

Referring firstly to FIG. 7, the cell comprises a container 30 sealed by a lid 32 and containing a plurality of positive plates 34 alternating with a plurality of negative plates 36 and separated therefrom by separators 38. The plates and separators are under a substantial compressive force. Each plate has an upstanding plate lug 40 and the lugs of plates of the same polarity are connected together by a respective plate strap 42 which is connected to a respective terminal 44 upstanding from the lid. The cell is sealed from the atmosphere but is provided with a relief vent 46 adapted to open if the pressure should rise above a pressure of e.g. 1.1 bar absolute. There is substantially no free sulphuric acid electrolyte in the cell whereby substantially all the electrolyte is absorbed in the plates and separators. The cell operates on the oxygen cycle whereby substantially only oxygen is evolved on overcharge which diffuses through the separators and is recombined at the negative plates. If the rate of gas evolution should temporarily exceed the rate of recombination, the excess gas is vented to atmosphere through the vent 46.

The separators are substantially planar and comprise reinforcement means surrounded by microfine glass fibre material. This material is made from fibres having diameters in the range of 0.01 microns, or less, up to 10 microns, the average diameter being less than 10 microns and preferably less than 5 microns. In use, the glass fibre material has at least a proportion of voids which are unfilled with electrolyte.

Figure 1:
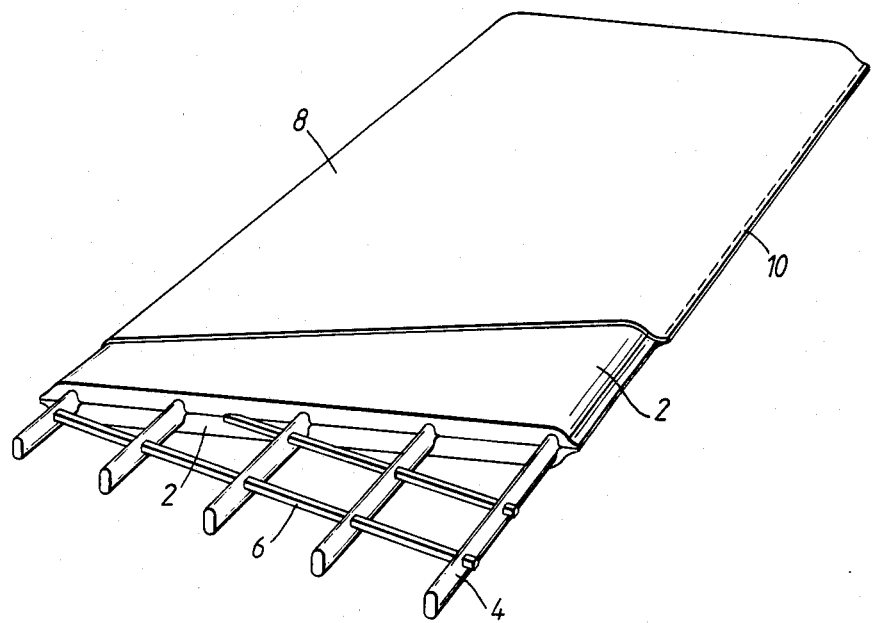
FIG. 1 is a partly cut-away perspective view of a separator within an outer sheath.

The separators may be as illustrated in FIG. 1 in which there are two layers or sheets 2 of glass fibre material about 1.5 mm thick. Sandwiched between these two sheets is a reticular reinforcing structure or grid of polypropylene or like material which is resistant to the electrolyte of the cell in which the separator will be used comprising a plurality of spaced parallel rods 4 comprising reinforcing elements which are integrally connected together by a plurality of spaced parallel connecting rods 6 which extend perpendicular to the rods 4 and have a lesser cross-section and are of lesser depth than the rods 4. The microfine glass fibre material 2 is soft and flexible and thus, at least in use in a cell, the two sheets of this material contact one another within the apertures defined by the rods 4 and 6.

The structure described above is enclosed within an outer sheath 8 of porous non-woven polyester fabric which is stitched or otherwise connected, e.g. by ultrasonic welding, along one or more edges to form a closed sheath.

The separator illustrated in FIG. 1 may be assembled individually by placing two pre-cut layers of microfine glass fibre material around a plastics grid and then subsequently sheathing it in polyester material or alternatively a continuous elongate plastics grid may be interposed between two continuous strips of glass fibre material and then continuously sheathed whereafter the structure is cut into individual lengths. In both cases the sheaths of the individual separators will in practice be open at both ends.

Figure 2:
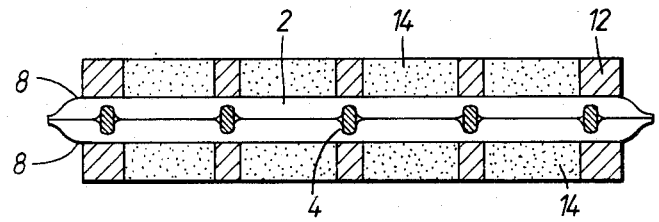
FIG. 2 is a diagrammatic sectional elevation through the separator of FIG. 1 sandwiched between two plates of a lead acid cell.

The separator illustrated in FIG. 1 is provided with five parallel reinforcing rods 4 and in use in a cell, e.g. of lead acid motive power type, these will contact the opposed surfaces of two adjacent plates of opposite polarity. Two such plates with an interposed separator are illustrated diagrammatically in FIG. 2. Each plate comprises five parallel, spaced vertically extending bars of lead or lead alloy which are integrally interconnected by a plurality of spaced, parallel, horizontally extending bars of lead or lead alloy. Each plate is pasted with active electrode material 14 in the conventional manner, which active material fills the spaces between the bars of the plate. The spacing of the vertical bars 12 of the plates is the same as that of the reinforcing bars 4 and thus when the separator is placed between the two plates the reinforcing bars 4 are in registry with the bars 12. FIG. 2 shows the two plates and associated separator before a compressive force is applied but it will be appreciated that when this force is applied the separator material between each bar 4 and the associated bars 12 will be compressed to a thickness approaching zero whilst the surface of the areas of active material will be contacted by the polyester fabric 8 which will thus serve to retain the active material in position.

Figure 3:
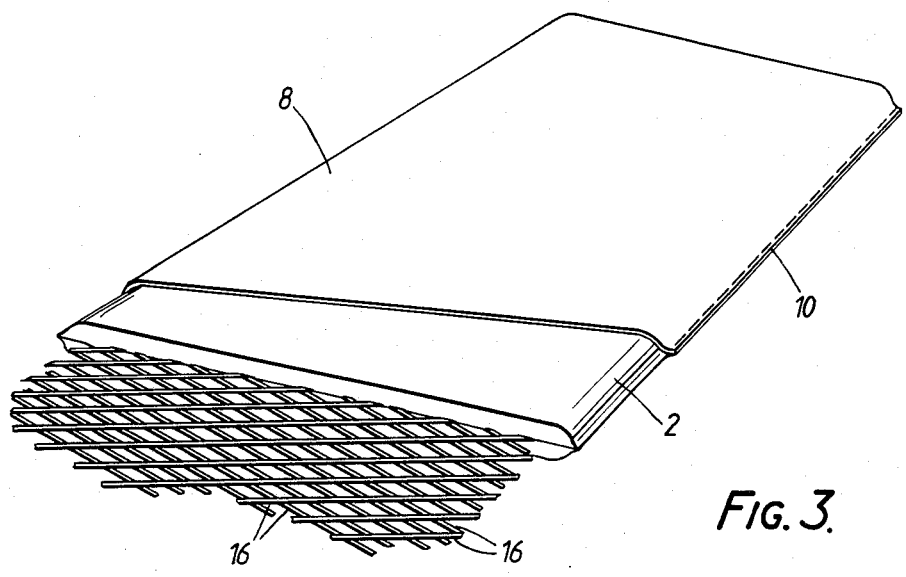
FIG. 3 is a view similar to FIG. 1 of a modified construction of separator.

An alternative separator is shown in FIG. 3 in which the reinforcing member is again sandwiched between two layers of glass fibre and accommodated within a sheath and is constituted by an integral grid or reticular structure of the type sold under the Registered Trade Mark NETLON comprising two sets of parallel rods 16 which have the same cross-section and which are inclined to one another at about 60°.

Figure 4:
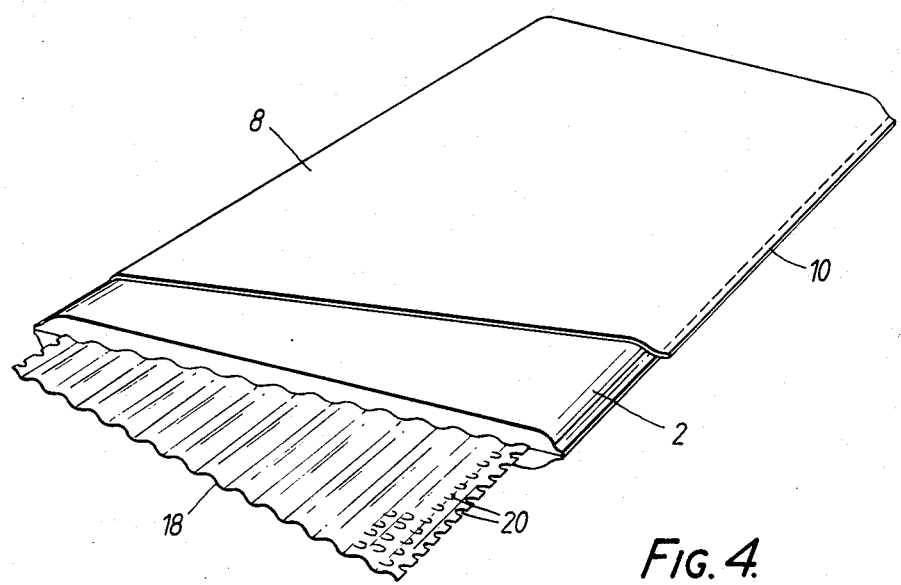
FIG. 4 is a view similar to FIG. 1 of a further modified construction of separator.
Figure 5:
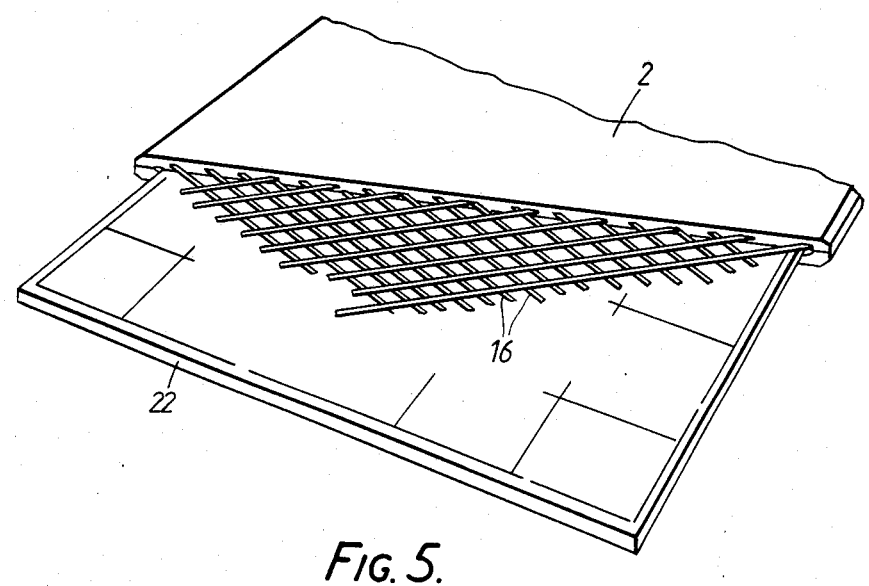
FIG. 5 is a partly cut-away perspective view of a single battery plate sandwiched between two separators.

In the further embodiment of separator illustrated in FIG. 4 there is a single reinforcing member comprising a corrugated plastics sheet 18 in which a plurality of apertures 20 is formed over its entire area (only a few of which are shown for the sake of simplicity). In use, the majority of the compressive force between adjacent plates is transmitted to and through the reinforcing members via the tops of the corrugations, that is to say along a plurality of spaced, parallel substantially line contacts and the absorbent compressible separator material situated adjacent the majority of the apertures 20 and situated in the troughs between adjacent corrugations is relatively uncompressed and this can retain an adequate amount of electrolyte and can perform its desired electrochemical function. FIG. 5 shows a further alternative in which a single plate 22 of a recombination cell is enclosed by two separators whose area is somewhat greater than that of the plate and thus prevent short circuits occurring between adjacent plates by reason of these contacting one another or by reason of the growth of lead dendrites. The reinforcing member in each separator comprises a NETLON grid which is not surrounded by two sheets of glass fibre material but is instead embedded in glass fibre material by building up a single layer of this material around the grids by a method similar to that used when paper making. The two separators may be connected together or the plate and the two separators may be enclosed in a single sheath thereby allowing them to be handled as a single unit. It will be appreciated that in this embodiment the reinforcing members may take any of the forms referred to or described above.

Figure 6:
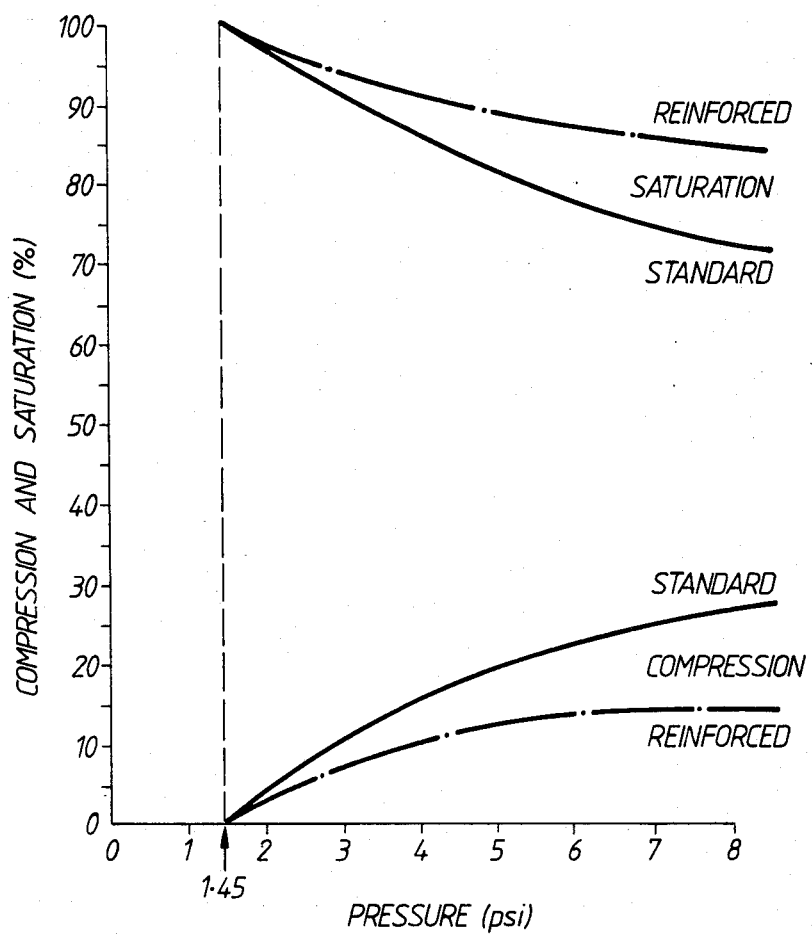
FIG. 6 is a comparative graph showing the variation of the average degree of compression and of the average degree of saturation with the applied pressure of a conventional microfine glass fibre separator and a separator of the type used in the cell of the present invention.

Referring now to FIG. 6, it will be seen that the average degree of compression of a reinforced separator of the type used in the cell of the present invention is less than that of a standard unreinforced glass fibre separator at any given compressive load. Furthermore, the average degree of saturation of the reinforced separator is greater than that of the standard separator at any given compressive load. Thus at a given degree of saturation the reinforced separator is less compressed which results in an improved contact with and thus an improved retention of the active electrode material on the positive plates.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A recombination electric storage cell comprising a container, a plurality of alternating positive and negative plates within said container and a plurality of separators, each adjacent pair of said plates being separated by one of said separators, said plates and separators being under a mutual compressive force, each said separator comprising reinforcing means and microfine glass fibre material surrounding said reinforcing means, said reinforcing means comprising one or more reinforcing members and extending over substantially the entire area of said separator and having a plurality of apertures in the reinforcing means, said apertures being substantially filled with said microfine glass fibre material, the reinforcing members being so constructed and arranged that the major proportion of said compressive force is transmitted through said reinforcing members while substantially the entire proportion of the surface area of said plates is contacted by said glass fibre material.

2. A cell as claimed in claim 1 wherein said reinforcing means comprises a plurality of elongated substantially incompressible reinforcing members.

3. A cell as claimed in claim 2 wherein said elongated reinforcing members comprise spaced substantially parallel members.

4. A cell as claimed in claim 1 wherein said reinforcing means comprises a first set of spaced parallel reinforcing elements integrally connected by a a second set of spaced parallel connection elements extending transverse thereto to form a recticular structure.

5. A cell as claimed in claim 4 wherein the cross-sectional area of said connection elements is less than that of said reinforcing elements.

6. A cell as claimed in claim 4 wherein said plates include a plurality of substantially parallel current carrying metallic members which carry active electrode material, at least some of said reinforcing elements being in registry with said current carrying members of the associated plates.

7. A cell as claimed in claim 4 wherein the cross-sectional area of said connection elements is substantially the same as that of said reinforcing elements.

8. A cell as claimed in claim 1 wherein said reinforcing means comprises a single reinforcing member having a plurality of apertures.

9. A cell as claimed in claim 8 wherein said reinforcing member is shaped so that said compressive force is transmitted through only a minor proportion of its area.

10. A cell as claimed in claim 8 wherein said reinforcing member comprises a corrugated sheet.

11. A cell as claimed in claim 1 wherein each separator further includes an outer porous fabric sheath surrounding the glass fiber material.

* * * * *